US010488657B2

(12) United States Patent
Sato (10) Patent No.: US 10,488,657 B2
(45) Date of Patent: Nov. 26, 2019

(54) HEAD-UP DISPLAY DEVICE WITH UNIFORM BRIGHTNESS (71) Applicant: NIPPON SEIKI CO., LTD., Niigata (JP)

(72) Inventor: Megumi Sato, Niigata (JP)

(73) Assignee: NIPPON SEIKI CO., LTD., Niigata (JP)

(*) Notice: Subject to any disclaimer, the term of this patent is extended or adjusted under 35 U.S.C. 154(b) by 0 days.

(21) Appl. No.: 16/093,925

(22) PCT Filed: Apr. 13, 2017

(86) PCT No.: PCT/JP2017/015133
§ 371 (c)(1),
(2) Date: Oct. 15, 2018

(87) PCT Pub. No.: WO2017/188008
PCT Pub. Date: Nov. 2, 2017

(65) Prior Publication Data
US 2019/0107713 A1  Apr. 11, 2019

(30) Foreign Application Priority Data
Apr. 26, 2016  (JP) ................................ 2016-088371

(51) Int. Cl.
*G02B 27/01*  (2006.01)
*B60K 35/00*  (2006.01)
*G09G 3/00*  (2006.01)

(52) U.S. Cl.
CPC .......... *G02B 27/0101* (2013.01); *B60K 35/00* (2013.01); *G09G 3/001* (2013.01);
(Continued)

(58) Field of Classification Search
CPC ................ G02B 27/01; G02B 27/0101; G02B 2027/0118; G02B 2027/0185;
(Continued)

(56) References Cited

U.S. PATENT DOCUMENTS

2014/0036374 A1  2/2014  Lescure et al.
2016/0178902 A1*  6/2016  Ando ..................... B60K 35/00
                                                                    348/115
2017/0235138 A1*  8/2017  Morohashi ............ B60K 35/00
                                                                    359/631

FOREIGN PATENT DOCUMENTS

JP  03-227736 A  10/1991
JP  2013-083675 A  5/2013
(Continued)

OTHER PUBLICATIONS

English language translation of Written Opinion of the International Searching Authority, dated Jun. 27, 2017 which was listed on the IDS filed Oct. 15, 2018.*
(Continued)

*Primary Examiner* — Laurence J Lee
(74) *Attorney, Agent, or Firm* — McDermott Will & Emery LLP (57) ABSTRACT Provided is a display device having high display quality. The head-up display device 100 comprises: a single display unit that outputs display light; an imaging position adjustment mirror that generates display light and display light upon receiving the display light, and sets a distance from the imaging position adjustment mirror to the position at which an image is formed by the display light to be longer than the distance from the imaging position adjustment mirror to the position at which an image is formed by the display light; a first screen disposed at the imaging position of the display light; and a second screen disposed at the imaging position of the display light. The light distribution angle of the second
(Continued)

screen is set to be larger than the light distribution angle of the first screen.

2 Claims, 5 Drawing Sheets

(52) U.S. Cl.
CPC ............... *B60K 2370/1529* (2019.05); *G02B 2027/0185* (2013.01); *G09G 2320/0233* (2013.01); *G09G 2380/10* (2013.01)

(58) Field of Classification Search
CPC ....... G09G 2320/0233; G09G 2380/00; G09G 3/001; B60K 2370/1529
See application file for complete search history.

(56) References Cited

FOREIGN PATENT DOCUMENTS

| | | | | |
|---|---|---|---|---|
| JP | 2015-034919 | * | 2/2015 | ............. G02B 27/01 |
| JP | 2015-034919 A | | 2/2015 | |
| JP | 2016-045252 A | | 4/2016 | |
| JP | 2016-053680 A | | 4/2016 | |

OTHER PUBLICATIONS

International Search Report issued in corresponding International Patent Application No. PCT/JP2017/015133, dated Jun. 27, 2017, with English Translation.

* cited by examiner

HEAD-UP DISPLAY DEVICE WITH UNIFORM BRIGHTNESS

CROSS REFERENCE

This application is the U.S. National Phase under 35 U.S.C. § 371 of International Application No. PCT/JP2017/015133, filed on Apr. 13, 2017, which claims the benefit of Japanese Application No. 2016-088371, filed on Apr. 26, 2016, the entire contents of each are hereby incorporated by reference.

TECHNICAL FIELD

The present invention relates to a display device.

BACKGROUND ART

As a vehicle display device, a head-up display (HUD: Head-Up Display) device such as that disclosed in Patent Literature 1 is known. The HUD device displays a virtual image by projecting display light corresponding to an image onto a projected member such as a windshield. For example, in the HUD device disclosed in Patent Literature 1, two virtual images having different distances as viewed from a viewer are displayed at one display. In particular, the HUD device is provided with: a display that generates and emits first and second projection light; an imaging position adjustment mirror that adjusts imaging distances of the first and second projection light; and first and second screens that receive and image the first and second projection light from the imaging position adjustment mirror. The first and second screens are respectively provided at positions spaced by different distances from the imaging position adjustment mirror.

CITATION LIST

Patent Literature

Patent Literature 1: JP 2016-45252 A

SUMMARY OF THE INVENTION

Problems to be Solved by the Invention

The imaging position adjustment mirror adjusts the imaging distances by adjusting an image-side NA (Numeric Aperture) of the first and second projection light. In particular, it is general that the second projection light imaged in the second screen disposed at a position away from the display has an image-side NA smaller than that of the first projection light imaged in the first screen disposed closer to the display than the second screen. A screen emits light having a diffusion angle corresponding to magnitude of the image-side NA of the projection light to be imaged. In particular, as the image-side NA becomes larger, the diffusion angle of the light emitted by the screen also becomes larger, and as the image-side NA becomes smaller, the diffusion angle of the light emitted by the screen also becomes smaller. That is, the diffusion angles of the light emitted by the first and second screens differ due to a difference in the image-side NA of the incident projection light.

The diffusion angle emitted from the screen affects an irradiation range of light to an eyebox that is a visible area of the viewer. For example, when light having a diffusing angle larger than a desired diffusion angle is emitted from the screen, the light is irradiated to a range exceeding the eyebox, and thus brightness of the virtual image decreases. Meanwhile, when light having a diffusion angle smaller than the desired diffusion angle is emitted from the screen, a whole area of the eyebox cannot be uniformly irradiated, and thus, it becomes difficult to attempt to bring uniformity of the brightness over the entire virtual image. Both case contribute to degradation in display quality.

The present invention has been made in view of the above circumstances, and an object thereof is to provide a display device with high display quality.

Means for Solving the Problem

To attain the object suggested above, a display device according to the present invention comprises: a single display configured to emit display light; an imaging position adjustment unit configured to generate first and second display light upon receipt of the display light and to set a distance from the imaging position adjustment unit per se to an imaging position in the second display light so as to be longer than a distance from the imaging position adjustment unit per se to the imaging position in the first display light; a first screen configured to be disposed at the imaging position in the first display light; and a second screen configured to be disposed at the imaging position in the second display light, and a light distribution angle of the second screen is set to be larger than a light distribution angle of the first screen.

Advantageous Effects of Invention

According to the present invention, a display device with high display quality can be provided.

BRIEF DESCRIPTION OF THE DRAWINGS

FIG. 2 (a) and FIG. 2 (b) according to one embodiment are diagrams for illustrating configurations of a first screen and a second screen.

FIG. 5 (a) and FIG. 5 (b) according to a variation are diagrams for illustrating the first screen and the second screen.

MODE FOR CARRYING OUT THE INVENTION

Hereinafter, a head-up display device according to one embodiment of the present invention (hereinafter, referred to as "HUD device") will be described below with reference to the accompanying drawings.

Figure 1:
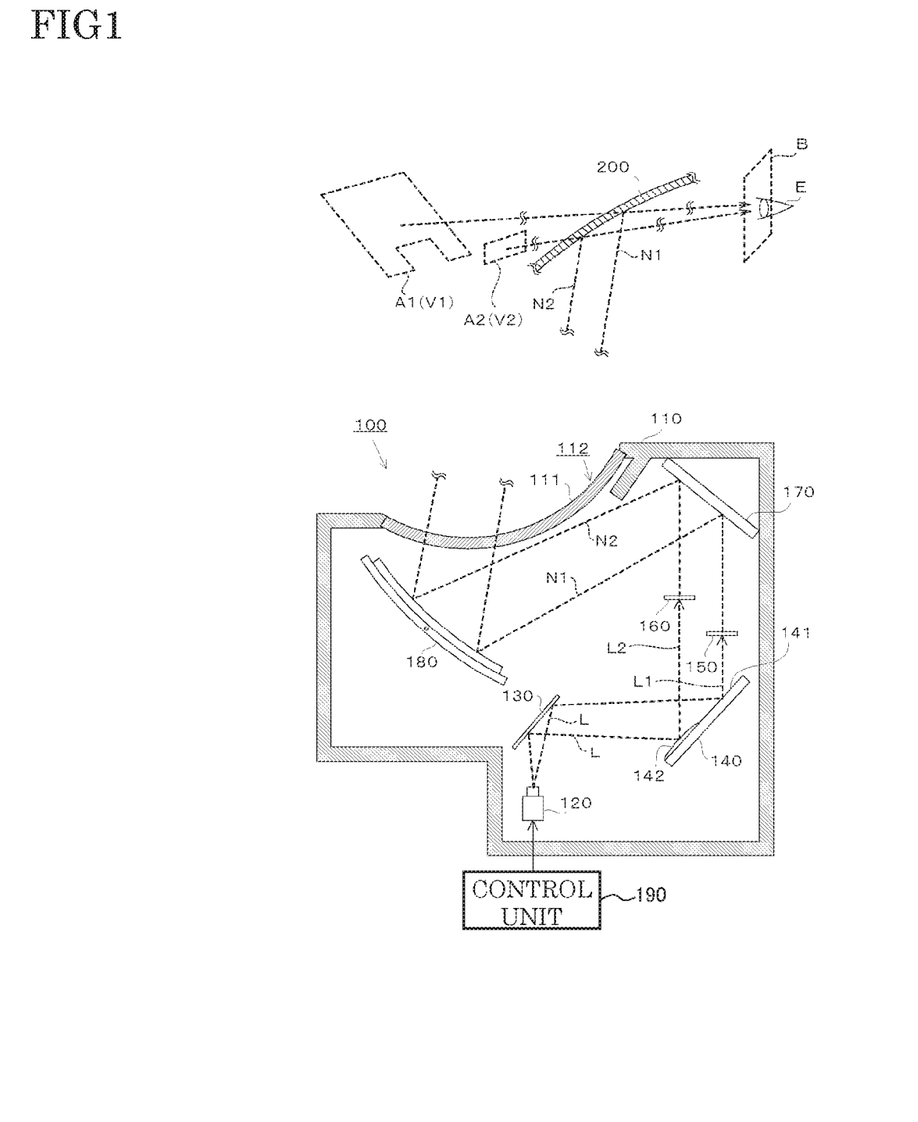
FIG. 1 is a schematic diagram showing a configuration of a head-up display device according to one embodiment.

A HUD device 100 according to this embodiment is mounted on a vehicle such as an automobile. As shown in FIG. 1, the HUD device 100 includes a housing 110, a display 120, a fold mirror 130, an imaging position adjustment mirror 140, a first screen 150, a second screen 160, a plane mirror 170, a concave mirror 180, and a control unit 190.

In this HUD device 100, display light L (L1, L2) from the display 120 is emitted to the first screen 150 and the second screen 160 via the fold mirror 130 and the imaging position adjustment mirror 140. These display light L1, L2 is imaged on the first screen 150 and the second screen 160, and thus a display image is displayed respectively, and display light N1, N2 corresponding to each display image is emitted to and are sequentially reflected by the plane mirror 170 and the concave mirror 180. Furthermore, the display light N1, N2 reflected by the concave mirror 180 is irradiated to a windshield 200 of a vehicle. Thus, a first virtual image V1 formed by the display light N1 and a second virtual image V2 formed by the display light N2 are visible to a viewer (mainly a driver E). The first virtual image V1 is formed in a first display area A1 that extends in a horizontal direction along a road surface and that is distant as viewed from the driver E. In this embodiment, the first display area A1 is formed in a concave shape with an opening facing downward as viewed from the driver E. The second virtual image V2 is positioned in the vicinity closer to the driver E than the first virtual image V1 as viewed from the driver E and is formed in a second display area A2 that extends in a direction perpendicular to a viewing direction of the driver E. In this embodiment, the second display area A2 is smaller than the first display area A1 and forms a rectangular shape in a lower side of the first display area A1 to fill a missing portion of the first display area A1.

The housing 110 is a box-shaped and houses various types of members of the HUD device 100. The housing 110 is formed of, for example, a black synthetic resin. In a part of a peripheral wall of the housing 110, an opening 111 for making the display light N1, N2 to pass from an inside of, to an outside of the housing 110 is provided. The opening 111 is covered with a translucent cover 112.

The display 120 that respectively emits the display light L to the first screen 150 and the second screen 160 has a transmission type display element such as a DMD (Digital Micromirror Device) and a LCOS (registered trademark: Liquid Crystal On Sillicon) and a transmissive type display element such as a TFT (Thin Film Transistor) liquid crystal panel. This display 120 emits the display light L1, L2 corresponding to the two display images to the fold mirror 130 on the basis of a control signal input from the control unit 190.

The fold mirror 130 is composed of a plane mirror obtained by forming a metal reflection film in one surface of a plate-like base material that is formed of a synthetic resin or a glass, and reflects the display light L emitted from the display 120 to the imaging position adjustment mirror 140.

The imaging position adjustment mirror (imaging position adjustment unit) 140 is obtained by forming a metal reflection film in one surface of a plate-like base material formed of a synthetic resin or a glass, and is composed of a bifocal mirror having two focal lengths (imaging distances). The imaging position adjustment mirror 140 has a first reflective surface 141 having a flat shape and a curved convex second reflective surface 142, and these reflective surfaces 141, 142 are formed adjacent to each other on a same surface.

The display light L incident on the first reflective surface 141 is reflected as the first display light L1 that is imaged at a position spaced by a first imaging distance F1 from the display 120. The display light L incident on the second reflective surface 142 is reflected as the second display light L2 that is imaged at a position spaced by a second imaging distance F2 from the display 120. In the present embodiment, the first imaging distance F1 of the first display light L1 is set to be shorter than the second imaging distance F2 of the second display light L2. Since the imaging distance F2 of the display light L2 is longer than the imaging distance F1 of the display light L1, an imaging angle $\theta1$ of the display light L1 becomes smaller than an imaging angle $\theta2$ of the display light L2.

The plane mirror 170 reflects the display light N1 incident from the first screen 150 and the display light N2 incident from the second screen 160 to the concave mirror 180. This plane mirror 170 is such that a metal reflection film has been formed in one surface of a plate-like base material that is formed of a synthetic resin, a glass or the like.

The concave mirror 180 reflects two display light N1, N2 toward the windshield 200. This concave mirror 180 is such that a metal reflection film has been formed in one surface of a base material that is formed of a synthetic resin, a glass or the like. The plane mirror 170 and the concave mirror 180 constitute an optical system that guides the two display light N1, N2 to the windshield 200.

The control unit 190 is provided with a CPU (Central Processing Unit) and the like, executes a control program stored in a storage unit (not shown), and controls a display by the display 120.

Figure 2:
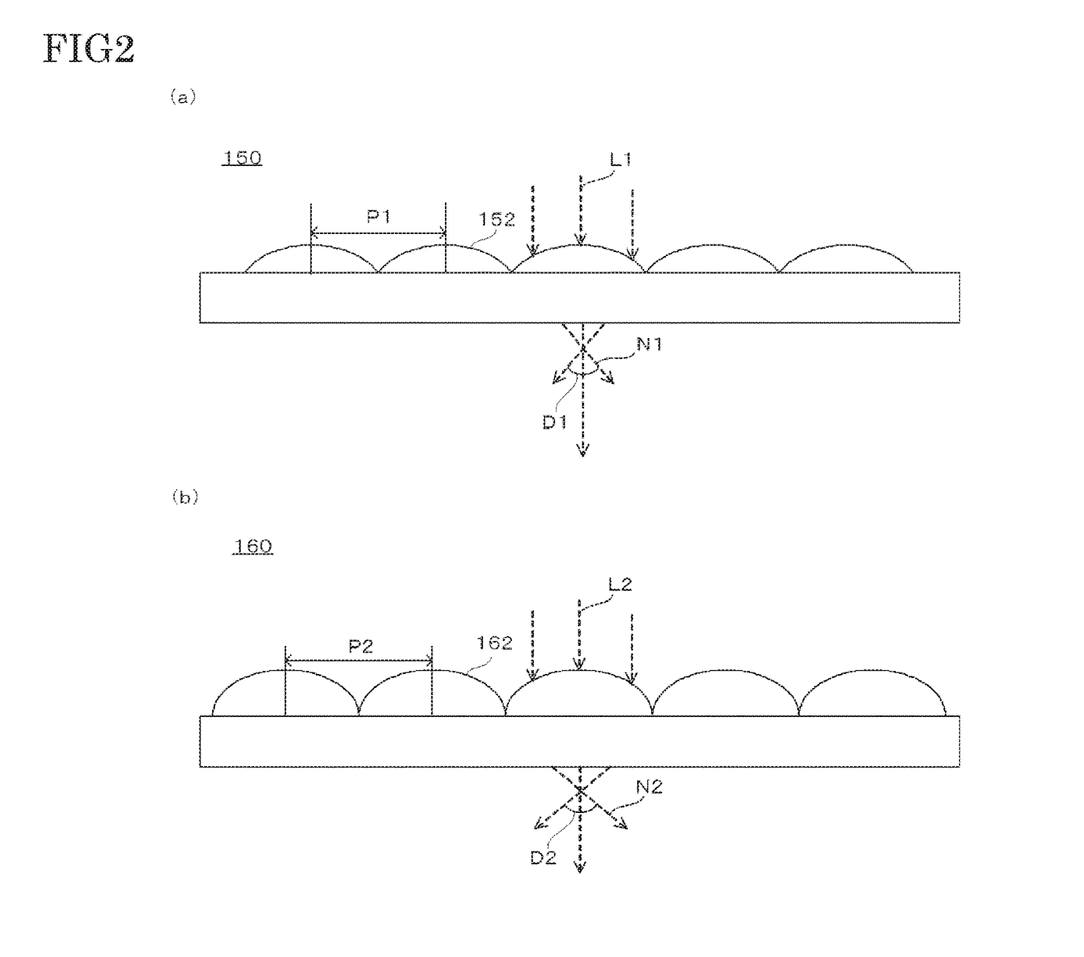

The first screen 150 and the second screen 160 are, as illustrated in FIG. 2 (a) and FIG. 2 (b), a transmission type screen provided with microlens arrays 152 and 162. Each microlens array 152 and 162 is obtained by arranging convex lenses in a matrix form. When the display light L1 is incident on one surface side of the first screen 150 from the display 120, a display image is displayed on the other surface side thereof. In addition, when the display light L2 is incident on one side surface of the second screen 160 from the display 120, the display image is displayed on the other surface side thereof. The display light N1 corresponding to the display image emitted from the abovementioned other surface side of the first screen 150 is emitted toward the plane mirror 170. Moreover, the display light N2 corresponding to the display image emitted from the abovementioned other surface side of the second screen 160 is also emitted toward the plane mirror 170.

An arrangement pitch P1 of the microlens array 152 of the first screen 150 is smaller than an arrangement pitch P2 of the microlens array 162 of the second screen 160. Thus, if, when the imaging angles of the display light L1 and the display light L2 are equal to each other, a diffusion angle D2 of the display light N2 becomes larger than a diffusion angle D1 of the display light N1. In other words, a light distribution angle $\theta y$ of the second screen 160 is set to be larger than a light distribution angle $\theta x$ of the first screen 150. These light distribution angles $\theta x$, $\theta y$ are a value determined by specifications of the first screen 150 and the second screen 160 and are obtained by a diffusion angle per unit imaging angle.

Next, the display light N1 emitted from the first screen 150 and the display light N2 emitted from the second screen 160 will be described with reference to FIG. 3 and FIG. 4 while comparing with a HUD device 1000 according to a comparative example.

Figure 3:
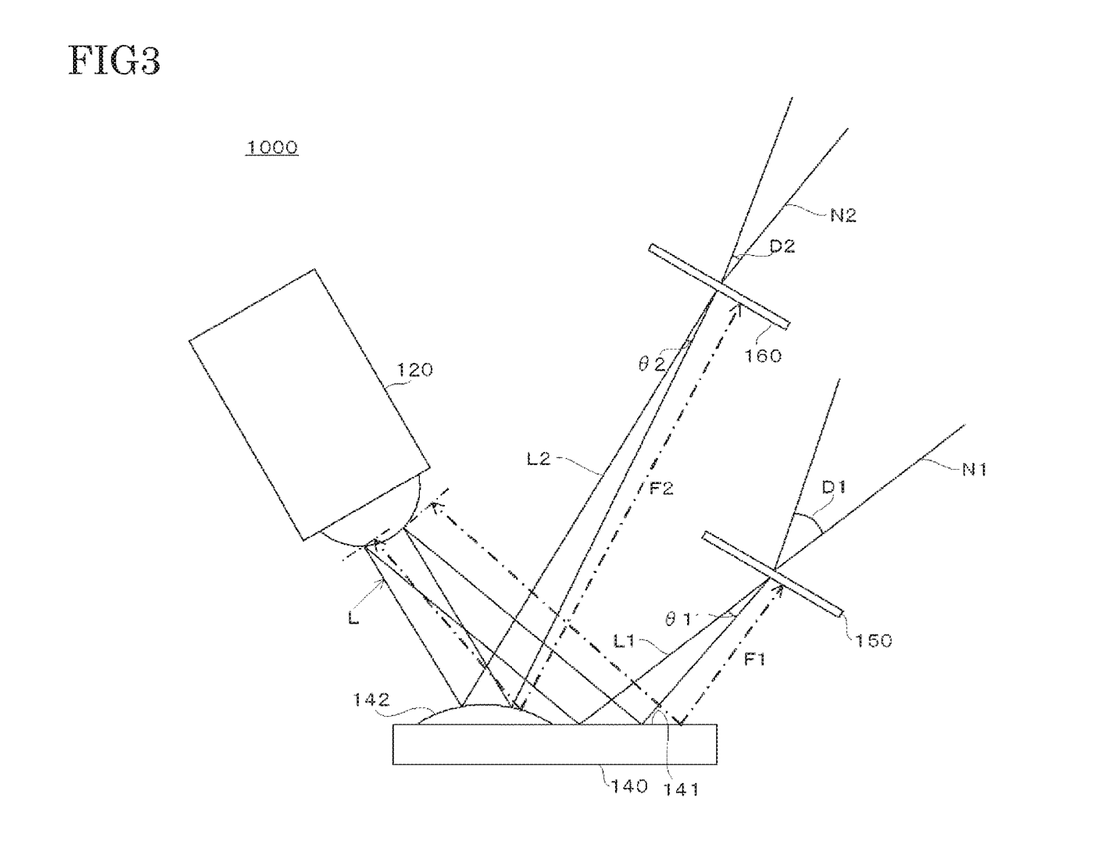
FIG. 3 is a schematic diagram for illustrating display light emitted from the first screen and the second screen of a head-up display device according to a comparative example.

The HUD device 1000 shown in FIG. 3 is such that a screen with a same light distribution angle is applied as the first screen 150 and the second screen 160. That is, when the imaging angle of the incident light to the first screen 150 and the imaging angle of the incident light to the second screen 160 are equal, display light with a same diffusion angle is emitted from the first screen 150 and the second screen each 160, respectively. In addition, other configurations are same as that of the HUD device 100. Moreover, the fold mirror 130 is not shown in FIGS. 3 and 4 for ease of description.

In this HUD device 1000, with regard to the display light L1, L2 emitted from the display 120, an imaging angle θ1 to the first screen 150 and an imaging angle θ2 to the second screen 160 are made to be different by the imaging position adjustment mirror 140 (in the present embodiment, the imaging angle θ1>the imaging angle θ2).

The first screen 150 emits the display light N1 corresponding to the display light L1 that has been incident at the diffusion angle D1. The second screen 160 emits the display light N2 corresponding to the display light L2 that has been incident at the diffusion angle D2. Here, the imaging angle θ1>the imaging angle θ2, and the first screen 150 and the second screen 160 are a same screen, and thus, the diffusion angle D1>the diffusion angle D2.

As stated above, in the HUD device 1000, the diffusion angle D1 of the display light N1 and the diffusion angle D2 of the display light N2 are different, and thus irradiation ranges of the display light N1 and the display light N2 are different when irradiating to an eyebox B of the driver E. Thus, as described above in the background art, in the HUD device 1000, it is difficult to enhance display quality.

Figure 4:
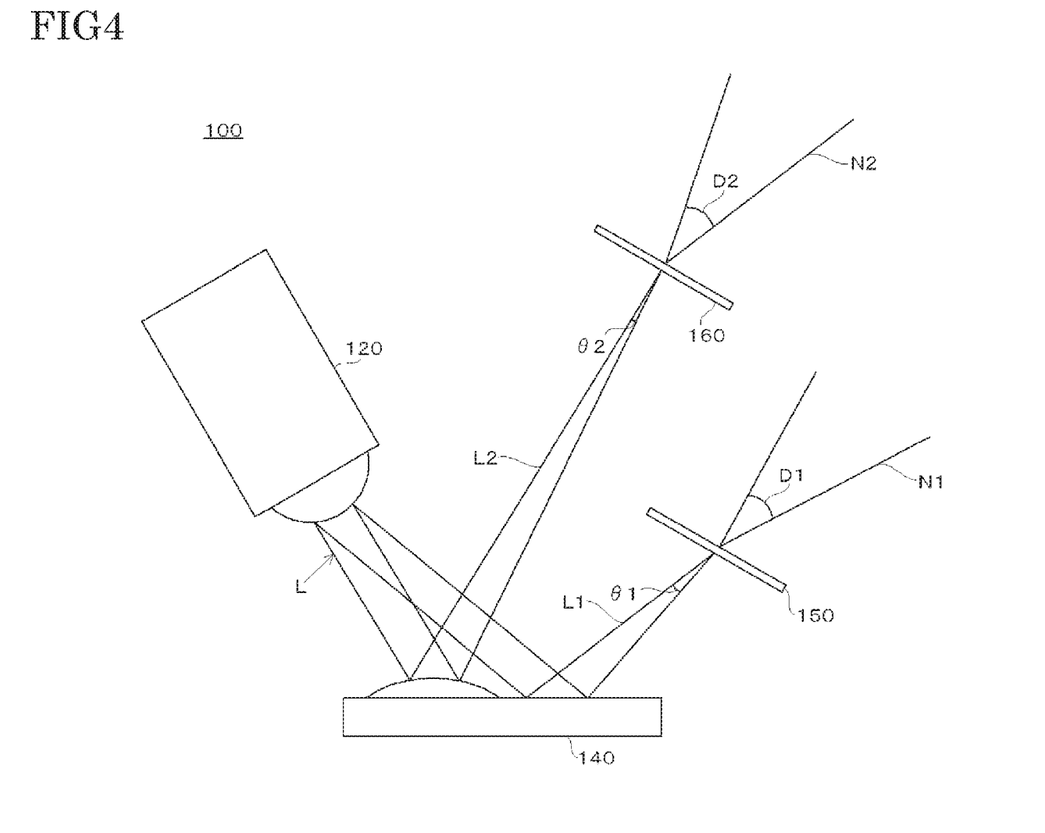
FIG. 4 is a schematic diagram for illustrating display light emitted from the first screen and the second screen of a head-up display device according to one embodiment.

Meanwhile, as shown in FIG. 4, in the HUD device 100 according to the present embodiment, although the imaging angle θ1 and the imaging angle θ2 are that the imaging angle θ1>the imaging angle θ2 as is the case with HUD device 1000, the light distribution angle θy of the second screen 160 is larger than the light distribution angle θx of the first screen 150, and thus the diffusion angle D2 approaches the diffusion angle D1. In this embodiment, the diffusion angle D2 becomes equal to the diffusion angle D1. Thus, the light distribution angle θx of the first screen 150 and the light distribution angle θy of the second screen 160 are set in such a manner that the first display light L1 and the second display light L2 uniformly irradiate the eyebox B of the driver E. Therefore, the irradiation ranges of the display light N1 and the display light N2 are approximately equal when irradiating to the eyebox B of the driver E. Consequently, as described above in the background art, the display quality of the HUD device 100 can be enhanced.

One embodiment of the present invention has been described above. In the HUD device 100 according to this embodiment, the arrangement pitch P1 of the microlens array 152 and the arrangement pitch P2 of the microlens array 162 are different from each other in accordance with a difference between the imaging angle θ1 of the display light L1 and the imaging angle θ2 of the display light L2, whereby the light distribution angle θx of the first screen 150 and the light distribution angle θy of the second screen 160 are adjusted. Thus, the diffusion angle D1 of the display light N1 and the diffusion angle D2 of the display light N2 become equal. Therefore, the display quality of the HUD device 100 can be enhanced.

While the embodiment of the present invention has been described, the present invention is not limited to the abovementioned embodiment, and various types of deformations and applications are possible.

While the HUD device 100 according to the present embodiment has been described by an example in which two screens (first screen 150, second screen 160) are provided, but the embodiment is not limited to this and may be provided with three or more of screens.

Figure 5:
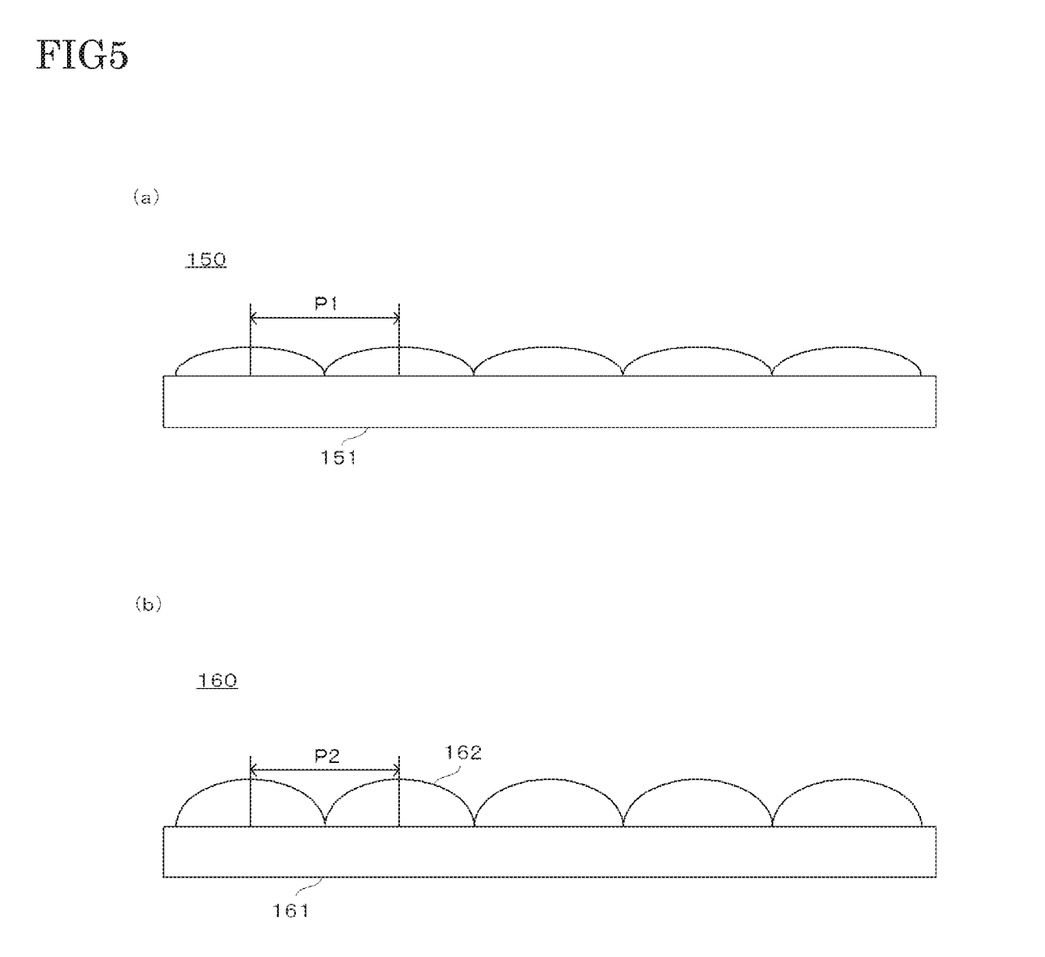

While the HUD device 100 according to the present embodiment has been described by an example in which the arrangement pitch P1 of the microlens array 152 of the first screen 150 and the arrangement pitch P2 of the microlens array 162 of the second screen 160 are different from each other with a view to adjusting the light distribution angle θx of the first screen 150 and the light distribution angle θy of the second screen 160, the embodiment is not limited thereto, and for example, may be configured in such a manner that curvature radiuses of the microlens array 152 and the microlens array 162 differ from each other. In particular, by taking advantage of that as a curvature radius becomes smaller, a light distribution angle becomes larger, as shown in FIG. 5(a), (b), the curvature radius of the microlens array 162 is made to be smaller than the microlens array 152 while the arrangement pitch P (P1, P2) each microlens array 152, 162 remains the same, and thus the diffusion angle D2 approaches the diffusion angle D1. In addition, the light distribution angles θx, θy may be adjusted by varying both the arrangement pitch P (P1, P2) and the curvature radius.

In addition, the imaging position adjustment mirror 140 of the present invention is not limited to a case of configuring with the reflective imaging position adjustment mirror 140 described above, and can be configured with a refractive imaging position adjustment lens (not shown). This imaging position adjustment lens may be configured to adjust an imaging distance by, for example, respectively disposing two lenses having same refractive power at positions the distances to the display 120 from which are different, on an optical path of the display light L1 and the display light L2. In addition, this imaging position adjustment lens may be configured to adjust the imaging distance by respectively disposing two lenses having different refractive power on the optical path of the display light L1 and the display light L2.

In addition, other than those using the microlens array described in the abovementioned embodiment, transmission type screens such as a holographic diffuser and a diffusion plate may be applied to the first screen 150 and the second screen 160 of the present invention. Even in a case of these translucent type screens, light distribution angles of the screens can be adjusted by adjusting a structure, a material, a composition, a manufacturing method, a combination of members and the like.

INDUSTRIAL APPLICABILITY

The present invention can be applied to a display device for displaying an image, a head-up display device for displaying a virtual image, and the like.

DESCRIPTION OF REFERENCE NUMERALS 100, 1000 head-up display device (HUD device)
110 housing
111 opening
112 cover
120 display
130 fold mirror
140 imaging position adjustment mirror (imaging position adjustment unit)
150 first screen
152 microlens array
160 second screen
162 microlens array
170 plane mirror
180 concave mirror
190 control unit
200 windshield
L, L1, L2, N1, N2 display light
E driver

The invention claimed is:

1. A display device comprising:
   a single display configured to emit display light;
   an imaging position adjustment unit configured to receive the display light, generate first and second display light, and set a distance from the imaging position adjustment unit per se to an imaging position in the second display light so as to be longer than a distance from the imaging position adjustment unit per se to the imaging position in the first display light;
   a first screen configured to be disposed at the imaging position in the first display light; and
   a second screen configured to be disposed at the imaging position in the second display light,
   wherein a light distribution angle of the second screen is set to be larger than a light distribution angle of the first screen.

2. The display device according to claim 1, further comprising:
   an optical system configured to guide the first and second display light from the first and second screens to a projected member, thereby irradiating the first and second display light reflected to the projected member to an eyebox of a viewer,
   wherein the light distribution angles of the first and second screens are set in such a manner that the first and second display light uniformly irradiates the eyebox.

* * * * *